United States Patent [19]
Caraculacu et al.

[11] 3,716,590
[45] Feb. 13, 1973

[54] PROCESS FOR PREPARING THE P,P-DINITROBIBENZYL

[75] Inventors: Dr. Eng. Adrian Caraculacu; Eng. Alla Petrus, both of Iasi; Eng. Mircea Laba, Ploiesti, all of Romania

[73] Assignee: Institutul De Chimie Macromolecular Petre Poni-Iasi, Iasi, Romania

[22] Filed: March 24, 1971

[21] Appl. No.: 127,815

[52] U.S. Cl. ............................260/645, 204/158 S
[51] Int. Cl. .............................C07c 79/10, B01j 1/12
[58] Field of Search ...................204/158 S; 260/645

[56] References Cited

UNITED STATES PATENTS 2,965,681   12/1960   Stansbury, Jr. et al. ............... 260/645
3,609,195   9/1971    Fields ............................... 260/645 X

OTHER PUBLICATIONS

Harbaum, et al., Chem. Eng. Sci., Vol. 13, No. 2, pp. 90 to 91

*Primary Examiner*—Leland A. Sebastian
*Attorney*—Karl F. Ross

[57] ABSTRACT p,p'-dinitrobibenzyl is produced by oxidizing p-nitrotoluene alone or in admixture with o-nitrotoluene in a pulsed column with air or oxygen in the presence of alcoholic alkali.

6 Claims, No Drawings

PROCESS FOR PREPARING THE P,P'-DINITROBIBENZYL

FIELD OF THE INVENTION

Our present invention relates to a process for preparing p,p'-dinitrobibenzyl and more particularly to a process which allows mixtures of the structural isomers of nitrotoluene to be used as a raw material.

BACKGROUND OF THE INVENTION

It has been proposed heretofore to prepare p,p'-dinitrobibenzyl by the heterogeneous oxidation of pure p-nitrotoluene in an alcoholic sodium hydroxide or potassium hydroxide solution. In general, the process involves bubbling air or oxygen through the p-nitrotoluene in a vessel in which the latter is dispersed in the alcoholic alkali solution. For the most part the process requires expensive starting materials since it will not operate effectively if the nitrotoluene is impure or admixed with other structural isomers such as o-nitrotoluene. Furthermore, it is essential in these prior-art systems to stir the reaction mixture strongly and in practice the stirring is limited by the nature of the reaction to about 500 rpm, a rate which is too slow for high reaction efficiencies. Furthermore, the yield of p,p'-dinitrobibenzyl is poor.

In fact, this method of producing p,p'-dinitrobibenzyl, and other laboratory methods which have been proposed, have not found industrial applications for numerous reasons. Firstly, it is difficult to stir the reaction systems at speeds above 500 rpm, a level which is considered the minimum for efficient reactor operation for the oxidation of nitrotoluene. Secondly, all of the prior art systems require excessively large volumes of air, e.g. 100 m³/kg of dinitrobibenzyl, since the reaction efficiency is poor, the gas phase (air) is difficult to disperse in the liquid phase and control of the air flow is difficult. In addition, such high volumes of air result in a loss of the alcohol from the alcoholic alkali medium. Thirdly, there is the practical difficulty of being unable to increase the concentration of p-nitrotoluene in the solution above 4.25 percent when the reaction period is less than 6 hours. When it is desired to increase the concentration of p-nitrotoluene in the solution, it is necessary to reduce the reaction temperature which further lowers the reaction rate and efficiency. We have already mentioned that a major disadvantage of the prior-art system is that it requires the use of p-nitrotoluene and cannot include o-nitrotoluene so that is is impossible to use the mixtures of the o-nitrotoluene or p-nitrotoluene which are commercially available from the nitration of toluene at much lower cost than the pure p-nitrotoluene.

Additional disadvantages of the prior-art systems are the batch nature of the processes, which cannot be carried out in continuous flow, the difficulty and cost of recovering the solvent or reaction medium carried off by the excess air and the fact that the product, when obtained, is impure. The difficulty is especially pronounced when the reaction medium is a mixture of methanol, dioxane and water in a ternary composition.

OBJECT OF THE INVENTION

It is, therefore, the principal object of the present invention to provide an improved process for making p,p'-dinitrobibenzyl.

DESCRIPTION OF THE INVENTION p,p'-dinitrobibenzyl is a compound having the general formula

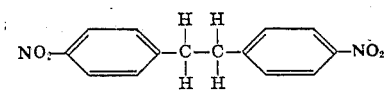

which has been found useful as a base intermediate for the synthesis of polyurethane. The utility of this compound is discussed in U.S. Pat. No. 2,965,681, British Pat. No. 1,138,380 and at page 1325 of volume 75, No. 6 of the *Journal of the American Chemical Society* (1953*(* (*) See also U.S. Pat. No. 3,247,162; French Pat. No. 1,402,576; Japanese Pat. Nos. 6583, 26817('65) and 6.819.104.)

The aforegoing object is attained, in accordance with the present invention, by a method of producing p,p'-dinitrobibenzyl from pure p-nitrotoluene or a mixture thereof with o-nitrotoluene by subjecting it to oxidation in a pulse column with air or oxygen as the gaseous oxidizing agent and in the presence of alcoholic alkaline, the pulse frequency ranging upwards of 200 pulse/minute.

Surprisingly, a pulsed column as the reactor provides an extraordinarily high efficiency of interaction between the gas phase and the liquid phase, automatically, results in a uniform dispersion of the gas phase, and has an effective stirring characteristics which greatly exceeds the stirring rates hitherto possible with such systems. Preferably, the column is packed or provided with perforated disks at either end and at one or more locations within the column, while a pulse generator is connected to the bottom thereof and is designed to generate pulses of an amplitude at least equal to the diameter of the column. Advantageously, the column has a height to diameter ratio of 20 to 1 and the minimum pulse stroke is about 1 mm. The pulse stroke may range up to 50 mm in accordance with the principles of the present invention.

The alcoholic alkali medium preferably consists of sodium hydroxide dissolved in methyl alcohol, advantageously in an amount of one gram of the alkali to 2 to 5 ml of methyl alcohol. Ethyl alcohol and potassium hydroxide may also be used as the alcohol and alkali respectively.

We have found that best results are obtained when the reaction is carried out at temperatures close to room temperature, i.e. between 15° and 40°C with the gaseous oxidizing agent being fed to the column initially at a relatively low rate, then at a somewhat higher rate and subsequently at a low rate to termination of the reaction. The present reaction may be carried out for a period of several hours, preferably 3 to 6 hours.

The following Examples are illustrative of the present invention. In each of the Examples, the column has a diameter of 25 mm and a height of 500 mm and is composed of glass. Sieve disks are provided within the column at a spacing of about 10 mm and a pulse generator in the form of a pneumatic ram communicates with the column at the base thereof and is energized at 500 pulsed/minute with a stroke of about 10 mm, calculated in terms of the motion of the liquid within the column.

The bottom of the column is also connected to a source of oxygen or air. It has been found that pulse frequencies of 200 to 3000 pulses/minute are effective with about equivalent results and that the stroke may be varied between 1 and 50 mm effectiveness. However, the stroke preferably ranges between 10 and 25 mm and should be at least equal to the diameter of the column. The p-nitrotoluene is introduced at the bottom of the column in a continuous flow in the alkali alcohol solution and a suspension of p,p'-dinitrobibenzyl is recovered at the top of the column. The product is filtered and processed as indicated below.

EXAMPLE I

For each 111 g of powdered p-nitrotoluene, 530 g of technical grade sodium hydroxide and 2300 ml of methyl alcohol were used to provide a feed solution. The feed solution was delivered to the column over a period of four hours and air was introduced into the column from the bottom after one hour with an air flow of 46 l/hour and a reaction temperature of 20°C, the temperature was raised to 25°C for the next hour and the air flow increased to 58 l/hour. The third hour of the reaction was carried out at a temperature of 30°C with an air flow of 46 l/hour and the last hour at a temperature of 30°C and an air flow of 35 l/hour.

At the conclusion, the mixture was filtered, washed in cold water and then washed in hot water until all traces of alkali were removed. The solid product was dried and was found to constitute 100 g of p,p'-dinitrobibenzyl, corresponding to a yield of 90 percent. The melting point of the product was 175° to 177°C. The specific consumption of the raw material per kg of dinitrobibenzyl were as follows:

| | |
|---|---|
| methyl alcohol | 23 l/kg |
| sodium hydroxide | 5.3 kg/kg |
| p-nitrotoluene | 1.11 kg/kg |
| and air | 1.85 m$^3$/kg (STP) |

EXAMPLE II

To a solution of 265 g of technical grade sodium hydroxide in 1150 ml of methyl alcohol, 111 g of ground p-nitrotoluene or in the form of a technical grade mixture of the ortho and para isomers obtained from the nitration of toluene, was added. The mixture was oxidized in the pulse column with air for one hour at 20°C at a flow rate of 115 l/hour, for the next hour at 20°C at an air flow rate of 400 l/hour, for the third hour at 25°C with an air flow rate of 350 l/hour and for the fourth hour at 30°C at an air flow rate of 115 l/hour. At the conclusion of the reaction, the mixture was filtered and washed with cold and hot water until traces of alkali disappeared. The product was dried. 100 g of p,p'-dinitrobibenzyl were obtained with a melting point of 175° to 177°C corresponding to a yield of 90 percent based upon p-nitrotoluene. The total oxidizing time was four hours and the specific consumption of the raw materials, per kg of dinitrobibenzyl were obtained:

| | |
|---|---|
| methyl alcohol | 11.5 l/kg |
| sodium hydroxide | 2.65 kg/kg |
| p-nitrotoluene | 1.11 kg/kg |
| air | 10 m$^3$/kg (STP) |

The process of Example II is carried out substituting oxygen for air in the following amounts: first hour at 20°C and oxygen flow rate of 10 l/hour, second hour at 20°C, oxygen flow rate of 40 l/hour, third hour at 25°C, oxygen flow rate 35 l/hour and fourth hour at 30°C, oxygen flow rate 12 l/hour. In this case, the methanol-saturated oxygen is recovered from the top of the column and recirculated with the mixture of the nitrotoluene. Oxygen consumption is reduced to 0.2 m$^3$/kg of p,p'-dinitrobibenzyl (STP) and methanol losses are avoided.

Tests were carried out using various mixtures of the ortho and para isomers of the nitrotoluene and no effect was found on the formation of pure p,p'-dinitrobibenzyl.

It was also found to be desirable to zone-heat the column at the specified temperatures and to pass the feed into the column at such rate that each zone was occupied by the reaction mixture for the indicated time period.

Among the advantages of the process of the present invention is a reduction of the oxygen consumption by comparison with earlier processes and even the possibility of attaining almost stoichiometric consumption of oxygen. The process may be carried out in less than 5 hours, has a yield of about 90 percent, yields a product which does not require further purification, allows methyl alcohol to be recovered with ease and permits the use of continuous flow or discontinuous flow as desired. One cannot overemphasize the importance of being able to use technical mixtures of the ortho and para nitrotoluenes or the significance of eliminating the need for high-speed stirring.

We claim:

1. A method of producing p,p'-dinitrobibenzyl, comprising the steps of oxidizing p-nitrotoluene in a mixture with o-nitrotoluene continuously in a pulsed column pulsed with a frequency of 200 to 3000 pulses/minute and a pulse amplitude of 1 to 50 mm in the presence of an oxidizing gas selected from the group which consists of ambient air or oxygen and an alcoholic alkali solution containing methanol or ethanol and sodium hydroxide or potassium hydroxide; continuously withdrawing p,p'-dinitrobibenzyl in said solution from said column; and recovering with p,p'-dinitrobibenzyl from said solution.

2. The method defined in claim 1 wherein said solution and said p-nitrotoluene are introduced into said column at one end thereof and a suspension of the p,p'-dinitrobibenzyl is recovered from the other end of said column continuously.

3. The method defined in claim 2 wherein said column has a ratio of its height to its diameter of substantially 20 to 1, the pulses have a pulse amplitude at least equal to the diameter of said column and the reaction is carried out over a period of 3 to 6 hours at a temperature ranging between 15° and 45°C.

4. The method defined in claim 3 wherein said reaction is carried out in a period of less than five hours and the reaction temperature is raised following the inception of the reaction.

5. The method defined in claim 4 wherein the rate at which said gas is supplied to said column is increased following the inception of said reaction and is reduced toward termination thereof.

6. The method defined in claim 5 wherein said solution is a solution of sodium hydroxide in methanol containing 1g of sodium hydroxide per 2 to 5 ml of methanol.

* * * * *